United States Patent
Amon et al.

(10) Patent No.: US 8,131,088 B2
(45) Date of Patent: Mar. 6, 2012

(54) SCALABLE METHOD FOR ENCODING A SERIES OF ORIGINAL IMAGES, AND ASSOCIATED IMAGE ENCODING METHOD, ENCODING DEVICE AND DECODING DEVICE

(75) Inventors: Peter Amon, Vaterstetten (DE); Gero Bäse, München (DE); Andreas Hutter, München (DE); Jürgen Pandel, Feldkirchen-Westerham (DE); Benoit Timmermann, Zomeding (DE)

(73) Assignee: Siemens Aktiengesellschaft, Munich (DE)

( * ) Notice: Subject to any disclaimer, the term of this patent is extended or adjusted under 35 U.S.C. 154(b) by 1127 days.

(21) Appl. No.: 11/631,256

(22) PCT Filed: Jun. 13, 2005

(86) PCT No.: PCT/EP2005/052712
§ 371 (c)(1),
(2), (4) Date: Dec. 3, 2007

(87) PCT Pub. No.: WO2006/000533
PCT Pub. Date: Jan. 5, 2006

(65) Prior Publication Data
US 2008/0199087 A1    Aug. 21, 2008

(30) Foreign Application Priority Data
Jun. 29, 2004    (DE) .......................... 10 2004 031 407

(51) Int. Cl.
*G06K 9/36*    (2006.01)

(52) U.S. Cl. ........ 382/232; 382/233; 382/236; 382/238; 382/246; 382/250; 375/240.01; 375/240.11

(58) Field of Classification Search .................. 382/232, 382/233, 101, 236, 238, 246, 250, 251; 375/240.1, 375/240.01, 240.11, 240.16; 348/155, 352, 348/384.1
See application file for complete search history.

(56) References Cited

U.S. PATENT DOCUMENTS
6,337,880 B1 *    1/2002    Cornog et al. ........... 375/240.01
(Continued)

FOREIGN PATENT DOCUMENTS
WO    2004/025965    3/2004

OTHER PUBLICATIONS
K. Hanke, "3D-Videocodierung", Retrieved from http://www.ient.rwth-aachen.de/forschung/pdf/3D_videocodierung.pdf, 4 pp.
(Continued)

*Primary Examiner* — Samir Ahmed
*Assistant Examiner* — Ali Bayat
(74) *Attorney, Agent, or Firm* — Staas & Halsey LLP (57) ABSTRACT

A series of decoded images is generated from a series of original images encoded by a first encoding technique following movement-compensated, predictive encoding, where a starting image of a group of successive original images that are to be encoded is defined by a second encoding technique following movement-compensated, temporally filtered partial band encoding based on a determined encoding property of a decoded image of the group of images that are to be encoded, the decoded image is used for generating an output image having a low resolution level, before the images are encoded. At least one output image is generated on each level of resolution from the successive original images of the group of from at least one decoded image during image encoding. The decoded images are provided only with a reduced quality while the reconstituted images are of great quality.

19 Claims, 5 Drawing Sheets

U.S. PATENT DOCUMENTS

2003/0133500 A1* 7/2003 Auwera et al. .......... 375/240.11
2005/0018771 A1* 1/2005 Bourge et al. .......... 375/240.16

OTHER PUBLICATIONS

"Video coding for low bit-rate communication", ITU-T H.263, Feb. 1998, pp. ii-x & 1-154.

"Advanced video coding for generic audiovisual services", ITU-T H.264, May 2003, pp. 1-11.

Heiko Schwarz et al., "Scalable Extension of H.264/AVC", ISO/IEC JTC1/SC29/WG11 MPEG04/M10569/S03, International Organization for Standardization, Mar. 2004, 39 pp.

Yun Q. Shi et al., Table of contents, "Image and Video Compression for Multimedia Engineering", CRC Press, 2000, 9 pp.

Marta Mrak et al., "An Overview of Basic Techniques Behind Scalable Video Coding", Proceedings of the 46th International Symposium on Electronics in Marine, ELMAR-2004, Jun. 16, 2004, pp. 597-602.

Heiko Schwarz et al., "SNR-scalable Extension of H.264/AVC", Joint Video Team (JVT) of ISO/IEC MPEG & ITU-T VCEG (ISO/IEC JTC1/SC29/WG11 and ITU-T SG16 Q.6), Sep. 2003, pp. 1-17.

PCT International Search Report, dated Aug. 29, 2005, and issued in corresponding PCT International Application No. PCT/EP2005/052712.

* cited by examiner

SCALABLE METHOD FOR ENCODING A SERIES OF ORIGINAL IMAGES, AND ASSOCIATED IMAGE ENCODING METHOD, ENCODING DEVICE AND DECODING DEVICE

CROSS REFERENCE TO RELATED APPLICATIONS

This application is based on and hereby claims priority to German Application No. 10 2004 031 407.1 filed on Jun. 29, 2004, the contents of which are hereby incorporated by reference.

BACKGROUND

As described by K. Hanke's description of "3D-videocodierung" at the website for the Institut für Nachrichtentechnik at Rheinisch-Wesfälische Technische Hochschule-Aachen, video encoding methods exploit specific signal properties for efficient encoding of a succession of images. In such cases spatial and temporal dependencies between the individual images or the pixels of these images are exploited. The better an image encoding or video encoding method is able to exploit these dependencies between the individual images or pixels, the greater in general is a compression factor which can be achieved.

A basic distinction is made in current methods for video encoding between hybrid encoding methods, such as the video coding standards ITU-T H.263 "Videocoding for Low Bitrate Communication", February 1998 or ITU-T H.264 "Advanced Video Coding for Generic Audio Visual Services", May 2003, for example, and so-called three-dimensional frequency encoding approaches. Although both methods attempt to encode the video signal, which consists of the succession of images, both spatially and also temporally, with hybrid encoding methods use is made initially of a movement-compensated prediction in the temporal direction and subsequently of a two-dimensional transformation of a difference image created, such as with the aid of a two-dimensional Discrete Cosine Transformation (DCT) for example, to enable a spatial correlation between adjacent pixels within the difference image to be removed.

With the three-dimensional frequency encoding approaches, such as the movement-compensated, temporally filtered partial band encoding for example, by contrast with the hybrid encoding methods, no temporal prediction but a "true" transformation in the direction of the time axis is performed, in order to thereby exploit the temporal correlation of consecutive images. With such partial band encoding the succession of images is encoded into a number of "temporal" frequency bands before the spatial two-dimensional decorrelation, such as with two frequency bands in a high and a low frequency band for the temporal high-frequency and low-frequency image components. In the fragmentation of the spectrum the distribution of the frequencies occurring in these frequency bands is heavily dependent on the size of the movement occurring in the video signal. Provided the observed video signal does not feature any moving or modified elements, all high-frequency "time spectrum components" are equal to zero and the total energy is concentrated on the partial frequency band. Normally however a change in an image over time will always be able to be seen in a succession of images, such as a local object displacement for example, a change of object size or a change of scene. This leads to a distribution of energy to a number of spectral coefficients, with high-frequency components also being produced.

To reduce the spectral components in the temporal high-frequency band and thus to concentrate the energy on the temporal low-frequency band, before the temporal filtering of the video signal into a number of "temporal" frequency bands, a movement estimation and a movement compensation of the images to be temporally filtered are undertaken.

According to H. Schwarz, D. Marpe and T. Wigand, Fraunhofer Institut für Telekommunikation, Heinrich Herz Institut, "Scalable Extension of H.264/AVC", ISO/IEC JTC1/SC29/WG11, MPEG04/M10569/S03, March 2004, the movement-compensated, temporally-filtered partial band encoding can also be used for adjusting a scalable video data stream. For example a temporal, a qualitative or also a spatial scalability is enabled in this way. Furthermore a combined scaling is presented in Chapter 3.2.4 of Schwarz et al. In this case two different basic qualities (L0, L1) are obtained with the aid of the hybrid encoding method. To achieve improved image qualities additional scaled video data streams are included, such as L2, L3, L4 and/or L5 for example. These additional scaled video data streams (L2, . . . , L5) are created in Schwarz et al. with the aid of a movement-compensated, temporally filtered partial band encoding. Thus it is known that a scalable video data stream can be created with the aid of a first encoding method following movement-compensated, predictive encoding and a second encoding method following movement-compensated temporally filtered partial band encoding.

SUMMARY

Described below are a method for image encoding and decoding, an encoding as well as a decoding device which allows image encoding and image decoding of a succession of original images with a movement-compensated, temporally filtered partial band encoding method with the assistance of a movement-compensated predictive encoding method in a simple and efficient manner.

With the method for encoding a group of successive original images, a group of successive decoded images is created from the group of successive original images with the aid of a first coding method, which is based on a motion-compensated, predictive coding, before the image encoding of an image group of consecutive original images by a second coding method, which is based on a motion-compensated, temporally filtered subband coding, a start image of the image group being defined based on an identified encoding property of one of the decoded images, which is used for generating an output image having a lower resolution of the image group, with at least one output image being generated at each resolution level by the image encoding of the consecutive original images of the image group and of at least one of the decoded images.

Through the described method for image encoding, in the encoding of the original images by the second encoding method, the determined encoding properties of the decoded images which are created by the first encoding method are taken into account. In this way the compression characteristic, such as the compression rate for example, or the image quality if the compression rate remains the same, is improved for the second encoding method.

Furthermore, by a suitable choice of start image for the image encoding by the second encoding method, the susceptibility to errors (error drift) of image information created by the second encoding method is reduced and thereby the image quality is enhanced.

Furthermore the described method makes possible random access to individual images which have been created after the first and/or second encoding method.

Preferably the start image is defined on the basis of the decoded image used, if an evaluation of the encoding property shows that at least one image block of the used decoded image was INTRA coded. Since an INTRA coded image block is often encoded in higher image quality and no error drift occurs in the INTRA coded image block, a reduced signal energy is thus achieved for at least one part of the image of the starting image of the lower resolution level and through this an improved compression property is made possible. An error drift does not occur, since with the INTRA coding no prediction from predecessor images takes place and thereby no errors can be transferred.

Alternately the start image is defined on the basis of the used, decoded image, if an evaluation of the encoding property shows that a defined number of image blocks of this used, decoded image were INTRA coded. In this way an increase in the compression efficiency of the second encoding method is achieved, since a number of image parts of the output image of the low resolution level exhibit a low signal energy and can therefore be encoded efficiently.

Alternately the start image is defined on the basis of the used, decoded image if an evaluation of the encoding properties is that all image blocks of this used, decoded image were INTRA coded. In this way a large increase in the compression efficiency of the second encoding method is achieved, since all image parts of the output image of the low resolution level exhibit an especially low signal energy and can therefore be compressed very efficiently.

Preferably a number of consecutive original images of the image group to be encoded are adjusted as a function of the encoding property determined. The result of this is that the number of consecutive original images of the image group can be set such that the decoded image which can be assigned for setting of a difference image for the output image of the low resolution level is that image which has a very low signal energy to be encoded.

If at least one intermediate image (Z1, Z2, Z3) is furthermore created at each resolution level (R1, R2) and the intermediate images and the output image of the low resolution level are compressed, a reduction of the data volume of the intermediate images and of the output image of the low resolution level is achieved. If in addition compression is undertaken in accordance with a wavelet-based transformation, this achieves an especially efficient reduction of the data volume of the intermediate images and of the output image of the low resolution level.

Also described is an image decoding method for decoding at least one image encoded by the method for image encoding. The result of this is that both the encoded images of the first encoding method and also the intermediate images and the output image of the low resolution level of the second encoding method, which were created In accordance with the method for image encoding, can be decoded.

Also described is an encoding device for encoding a succession of original images. This makes it possible to execute the method for image encoding in a device such as a mobile telephone for example.

Also described is a decoding device for executing the image decoding method. This enables the image decoding method to be executed in a device such as a mobile telephone for example.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the exemplary embodiments, examples of which are illustrated in the accompanying drawings, wherein like reference numerals refer to like elements throughout.

Figure 1:
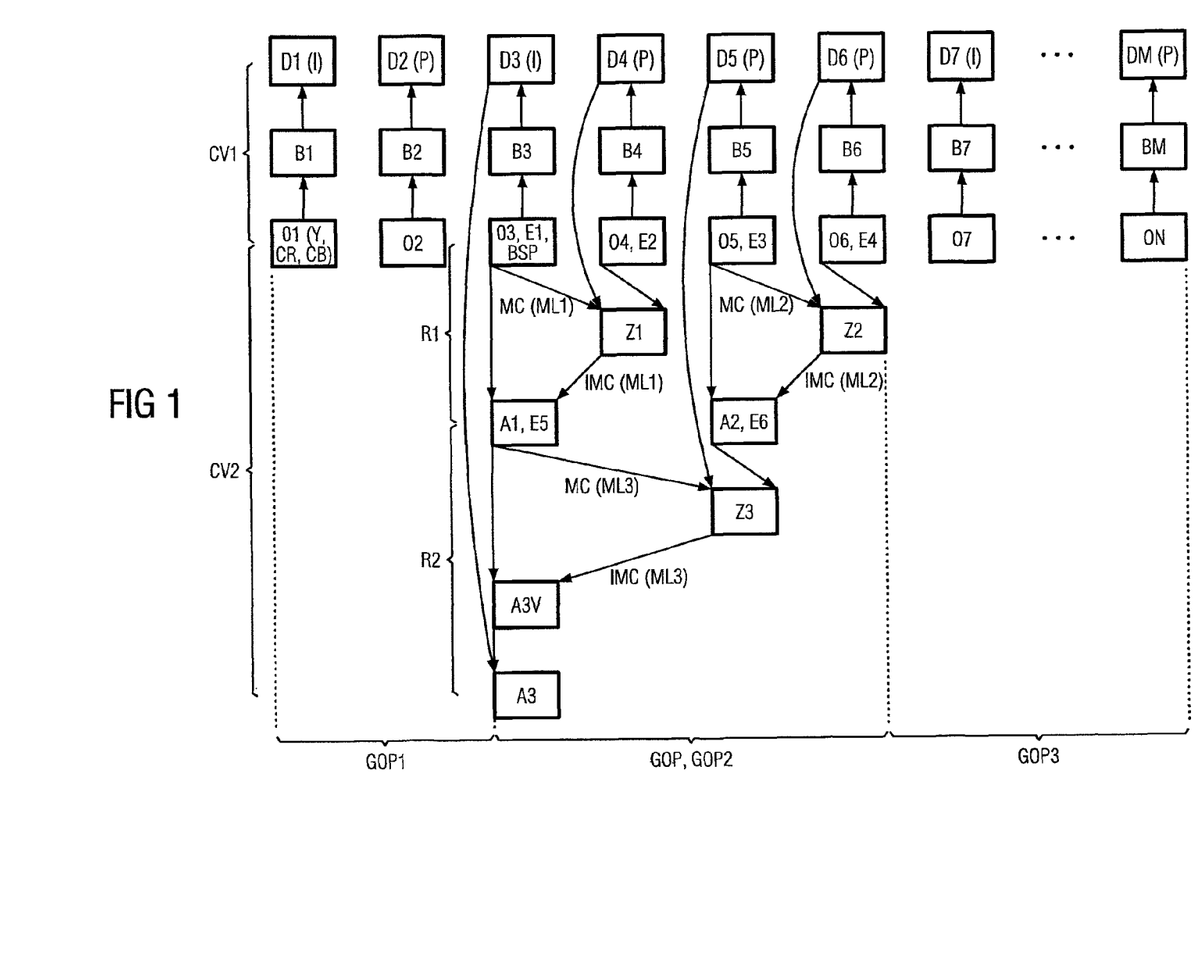
FIG. 1 is a schematic diagram of an encoding of a succession of original images, which are compressed by a first encoding method following a movement-compensated, predictive encoding and which are encoded by a second encoding method following a movement-compensated temporally filtered partial band encoding taking into account the decoded images of the first encoding method.

FIG. 1 shows an exemplary embodiment of the method described below. As illustrated therein, a succession of original images O1, . . . , ON are to be compressed using a first encoding method CV1 and a second encoding method CV2. These original images O1, . . . , ON were for example created by a camera K and will be provided in the color format with a brightness component Y and two chrominance components CR, CB in an image size with 640×480 pixels. Furthermore the original images O1, . . . , ON can be subjected before their encoding to image processing, such as noise suppression or edge sharpening for example.

First of all the first encoding method CV1 carries out a movement-compensated, predictive encoding of the original images O1, . . . , ON. These types of movement-compensated, predictive encoding methods are known from S. Jun, S. Huifang, "Image and Video Compression for Multimedia Engineering", CRC Press, 2000, such as the ITU-T H.263 standard for example. With this standard encoded images B1, . . . , BM can be created from the original images O1, . . . , ON using an INTRA coding mode and/or an INTER coding mode. The INTRA coding mode encodes individual image blocks of the relevant original image O1, . . . , ON without taking account of other original images O1, . . . ON. By contrast, in the INTER coding mode, individual image blocks of the relevant original image O1, . . . , ON are compressed, taking into account one or more already encoded images B1, . . . BN. In addition it is advantageous, in the INTER coding mode, to carry out an estimation of the movement of the image block of the original image O1, . . . , ON to be encoded and then only to encode this image block after a movement compensation. Methods for estimating movement or compensating for movement are known from Jun et al.

Furthermore the number M of the encoded images B1, ..., BM can deviate from the number N of the original images O1, ..., ON, since for example not all original images O1, ..., ON will be encoded.

Next, a succession of decoded images D1, ... DM are created from the encoded images B1, ..., BM with the aid of the first encoding method CV1 Furthermore, for each decoded image D1, ..., DM a separate decoding list can be created, which specifies which image blocks of the relevant decoded image D1, ..., DM have been encoded with the INTRA coding mode and which with the INTER coding mode. These decoded images D1, ..., DM are taken into account in the subsequent processing steps by the second encoding method CV2. For the exemplary embodiment shown in FIG. 1 those decoded images D1, ..., DM for which all image blocks were created with the INTRA coding mode are marked "I" and those for which at least one image block was encoded with the aid of the INTER coding mode are marked "P".

In a subsequent step all consecutive original images O1, ..., ON of a relevant image group GOP are encoded with the aid of the second encoding method CV2. In the present exemplary embodiment three different image groups GOP1, GOP2, GOP3 can be seen. In this case the number of the original images of the second image group GOP2 to be encoded has been selected as four. The number of original images to be encoded per image group GOP can vary, e.g. first of all two, then four and then eight original images are encoded in the relevant image group GOP1, GOP2, GOP3. Thus for example the first original image of the second image group GOP2 to be encoded is the third original image O3. The first original image of a respective image group GOP in each case is referred to below as the start image BSP.

Within the framework of this disclosure, a movement-compensated, temporally filtered partial band encoding method is to be seen as an encoding method in which, at a number of resolution levels, at least one output image in each case is created from at least two input images. In addition intermediate images can also be created. The relevant intermediate image represents the movement-compensated components of the associated input images of a first partial band. The relevant output image includes the movement-compensated component of the associated input images of a second partial band. The first partial band includes for example the high frequency and the second partial band the low-frequency components. At each lower resolution level at least two output images of the higher resolution become the input images.

The second encoding method CV2 depicted in FIG. 1 shows within the second image group GOP2 of two resolution levels R1, R2. In the first resolution level R1 an intermediate image Z1, Z2 and an output image A1, A2 respectively are created from two input images E1 and E2, E3 and E4 and the two associated decoded images D4, D6. The two output images A1, A2 are used as input images E5, E6 of the next resolution level R2. At the second resolution level R2, which in this exemplary embodiment corresponds to the lower resolution level, a third intermediate image Z3 and a third output image A3 are created from the input images E5, E6 together with the decoded images D3, D5. In this exemplary embodiment the low resolution level R2 simultaneously represents a lowest resolution level. The lowest resolution level can be seen as that resolution level which generates only one output image within the image group GOP. The functioning of the relevant resolution levels R1, R2 is explained in greater detail by examples which refer to FIG. 2 and FIG. 3.

Figure 2:
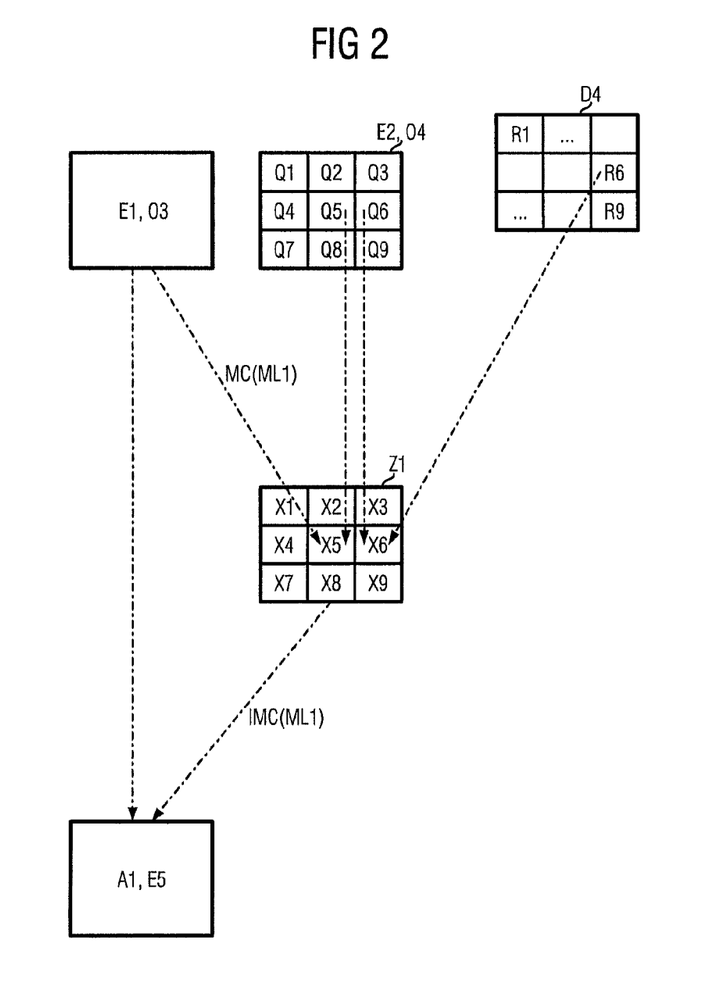
FIG. 2 is a more detailed diagram of the setting of an intermediate image and of an output image using the second encoding method, which are generated in a number of processing steps within the first resolution level from two input images, with a decoded image of the first encoding method being taken into account in the creation.

FIG. 2 shows two input images E1, E2 which correspond to the original images O3 or O4. The second input image E2 is subdivided into a number of image blocks Q1, ..., Q9 for example. These image blocks Q1, ..., Q9, which for example correspond to the macro blocks known from Jun et al., can have 16×16 pixels. Initially the second encoding method CV2 carries out a movement estimation on the first input image E1 for at least one image block Q1, ..., Q9 of the second input image E2, e.g. for image block Q5, Possible strategies for performing the movement estimation are known from Jun et al. If a matching image area was found in the first input image E1, this found image area is temporally highpass filtered after a movement compensation MC with the image block Q5 of the second input image E2, for example by subtraction of the relevant pixels. The movement vectors found are summarized in a first movement vector list ML1.

If no good movement estimation is found for an image block Q1, ..., Q9, then for this image block Q1, ..., Q9 for temporal lowpass filtering, a corresponding image block R1, ..., R9 can be included from the decoded image D4 belonging to the second input image E2. For example no suitable image area has been found for the image block Q6 in the first input image E1, so that the image block R6 of the fourth decoded image D4 is filtered with the image block Q6 of the second input image E2.

Thus a first intermediate image Z1 is produced by temporal highpass filtering. The result of the additional use of the fourth decoded image D4 for the setting of the first intermediate image Z1 is that the first intermediate image Z1 has less signal energy and thus a higher compression rate or, if the compression rate remains the same, a higher image quality can be achieved by a subsequent compression method, such as a wavelet-based transformation for example.

In a subsequent step the first output image A1 is created step-by-step. To this end the respective image blocks of the first intermediate image Z1, which have been created with the aid of the first input image E1, are temporally lowpass filtered with the first input image E1 using an inverse movement compensation IMC (ML1), which takes account of the movement vectors of the first movement vector list ML1. The temporal lowpass filtering can be executed by addition of the relevant pixels of the inverse movement-compensated image block of the first output image Z1 and image block of the first input image E1. The first output image A1 contains the "temporal" lowpass components of the input images E1, E2. The second output image A2 is created in the equivalent manner from the input images E3 and E4. In this case a second movement vector list ML2 is generated.

In the present exemplary embodiment the procedure for executing the method has been explained on the basis of images with 3×3 image blocks. In general there can be any number of image blocks, such as for example 4×4, 8×9 or 11×9. In addition the number of image blocks of the decoded images and of the input images can differ.

Figure 3:
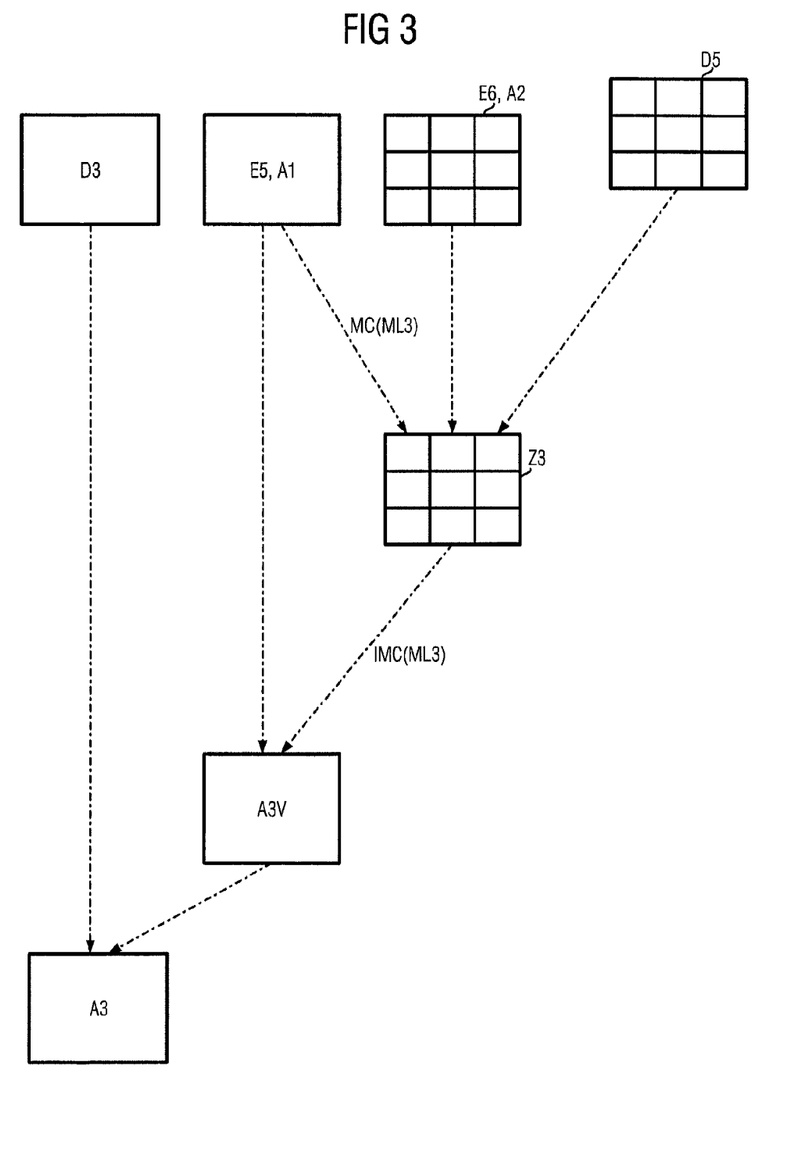
FIG. 3 is a schematic diagram of the processing steps within the low resolution level, with an intermediate image and an output image being created using two input images and two decoded images.

The individual processing steps of the second resolution level R2, which corresponds to the lower resolution level, are explained in greater detail below with the aid of FIG. 3. With the aid of the fifth and sixth input image E5, E6, which correspond to the first and second output image A1, A2 of the preceding resolution level R1, and using the decoded image D5 belonging to the sixth input image E6, the third intermediate image Z3 is created after a movement estimation and movement compensation MC (ML3). In this case a third movement vector list ML3 is generated. Furthermore, after an inverse movement compensation IMC (ML3) and taking into account the third input image E3, the provisional third input image A3V is created. The third intermediate image Z3 includes the high-frequency components of the temporally filtered input images E5, E6. Furthermore the provisional third output image A3V includes the lowpass components of the temporally filtered input images E5, E6. If the resolution levels R1, R2 are considered jointly, the provisional third output image A3V represents the "temporal" lowpass components of the second image group GOP2 of consecutive original images O3, O4, O5, O6. In an additional processing step, prediction, such as pixel differentiation of the provisional third output image A3V and of the associated third decoded image D3 for example, is used to create the third output image A3.

This third output image A3 and the intermediate images Z1, Z2, Z3 can be compressed before transmission to a decoding device DV, such as by a wavelet transformation for example.

In accordance with the exemplary embodiment shown in FIG. 1, the assignment of the start image BSP for the image encoding has been selected according to the second encoding method CV2 such that image this corresponds to the third original image O3. Since the number of original images O3, ..., O6 of the second image group GOP2 to be encoded in the present exemplary embodiment has been selected as four, the original images O3, O4, O5, O6 will be jointly encoded. After their compression the next four original images, beginning with the seventh original image O7, can be compressed in accordance with the second encoding method CV2. This can be continued through to the end of the succession of original images O1, ..., ON to be encoded. However the second encoding method CV2 can also combine more or fewer consecutive original images O1, ..., ON into an image group GOP for encoding.

According to the method, before image encoding by the second encoding method CV2, following a movement-compensated, temporally filtered partial band encoding, the start image BSP of an image group GOP of consecutive original images O1, ..., ON to be encoded is defined on the basis of a determined encoding property of a decoded image D3 used to create an output image A3 of the lower resolution level R2 of this image group GOP to be encoded. Since the image quality of the output image of the lower resolution level, in the exemplary embodiment this is the third output image A3 of the second resolution level R2, depends on the associated decoded image, such as the third decoded image D3 for example, the image quality of the associated decoded image is of considerable importance. The image quality of the associated decoded image essentially depends on the encoding property to which this decoded image was subjected during its creation by the first encoding method CV1. Thus by the selection of the start image BSP of the image group GOP, such as of the second image group GOP2, depending on the encoding property of the decoded image used for the output image of the lower resolution level, the image quality of the output image of the lower resolution level is significantly influenced. With an optimum selection of the start image BSP for the image group GOP an image with lower signal energy is generated for example for the third output image A3 which can be compressed very efficiently.

The encoding property can be determined by evaluation of the decoding list belonging to the decoded image in each case. Furthermore the encoding property is also obtained by analysis of the encoded image belonging to the decoded image. Thus for example the image blocks MB1 in the first decoded image D1 which were compressed by the INTRA or the INTER coding can be determined from analysis of the first encoded image B1.

In addition the start image BSP is defined on the basis of the decoded image used, e.g. D3, if an evaluation of the encoding property shows that at least one image block MB1 of this used, decoded image D3 was INTRA coded. An image block MB1 is for example to be understood as an image area consisting of 16×16 pixels. Since the INTRA coded image block MB1 is typically subjected to a lower quantization than would be the case if this image block MB1 were to have been INTER coded, a higher image quality is produced for the image block MP1 of the decoded image D3 used than is produced with an INTER coding. Thus for the third output image A3 a differential image with lower signal energy can be obtained, which can be compressed very efficiently by a downstream wavelet compression for example. Furthermore the use of an INTRA coded image block MB1 is also advantageous, since decoding errors typically occurring within the sequence of encoded images B1, ..., BM are not accepted by an INTRA coded image block MB1 from a previous encoded image B1, ..., BM and thereby an image error also does not occur in the associated decoded image D1, ..., DM.

Furthermore the start image BSP can be defined on the basis of the decoded image D3 used, if an evaluation of the encoding properties shows that a defined number AM of image blocks MP1 of this used, decoded image D3 were INTRA coded. If for example a number of possible start images BSP are available, then through this variant of the method, that start image BSP is selected by the second encoding method CV2 for the encoding of the image group GOP in which the predeterminable minimum number AM of INTRA coded image blocks MB1 can be found of the associated decoded image D1, ..., DM. This will be explained by the following example. The start image BSP should be selected so that the decoded image used for the third output image A3 has at least 20 image blocks MB1, which were compressed by the INTRA coding mode. The third or fourth original image O3, O4 can be selected as the start image BSP. The decoded images associated with the third and fourth original images O3, O4 are the third and fourth decoded images D3, D4. In the third decoded image D3, 25 INTRA coded image blocks MB1, and in the fourth decoded image D4, 19 INTRA coded image blocks MB1 are present. Thus the third original image O3 is selected as the start image BSP of the second image group GOP2 for encoding the succession of original images O1, ..., ON.

In a possible further variant of the method, the start image BSP is defined on the basis of the decoded image D3 used, if an evaluation of the encoding property shows that all image blocks MB1 of this used, decoded image D3 were INTRA coded. This is advantageous, since a small difference signal with a small signal energy can thus be found for the entire third output image A3. In this case the start point coincides with an "I"-marked decoded image D1, ..., DM.

Further it can be necessary, for the determination of the start image BSP, not only to take into account the coding property K1, but also a maximum number of consecutive original images O1, ..., ON, whereby this maximum number may not typically not be exceeded. For example, as a result of determining the encoding property, the start image BSP of the next image group to be encoded, e.g. GOP2, should be selected so that an image group to be encoded, e.g. GOP1, should include ten original images. The maximum number per image group is however limited to six original images. Thus for example the current image group GOP1 to be encoded is divided into two subgroups, so that first of all six and then four original images are encoded in a relevant image group.

Figure 5:
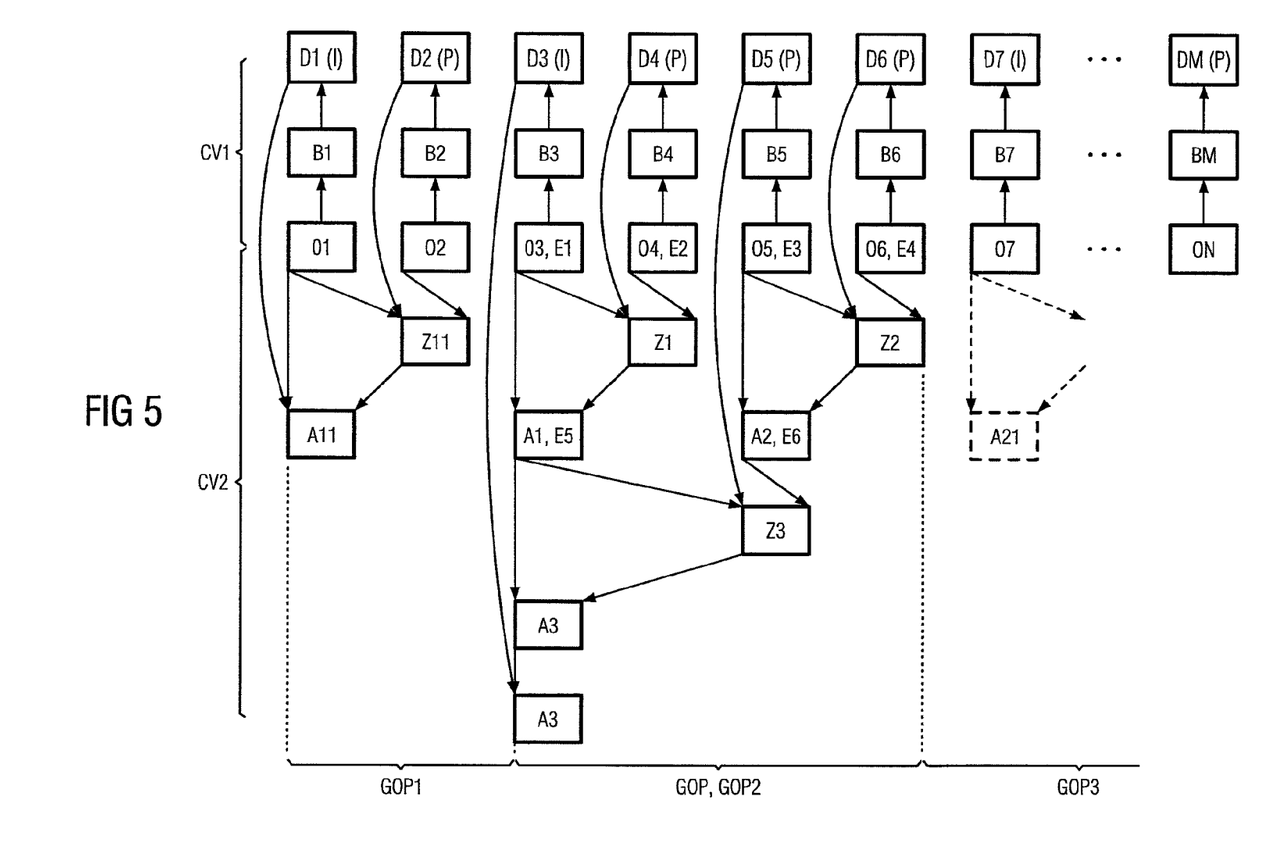
FIG. 5 is a schematic diagram of the compression of a succession of original images with a first and a second encoding method, with a number of image groups each with a different number of original images to be encoded being compressed by the second encoding method.

In a variant of the method a number of successive original images O1, ..., ON of the image group GOP to be encoded can be set, depending on the encoding property K1 determined. This is explained in greater detail in FIG. 5, with those original images O1, ..., ON always being used as a start image BSP on the basis of the determined encoding property K1 for example, for which all image blocks MP1 of the associated images D1, ..., DM are INTRA coded. These decoded images D1, ..., DM are identified with an "I". Initially the first original image 01 is used as the start image BSP of the first image group GOP1 for encoding of the original images O1, ..., ON. In this case the output image A11 and the intermediate image Z11 are generated. The encoding according to the second encoding method CV2 is already aborted after the second original image O2. Then, with the third original image O3, a decoded image D3 marked with an "I" is available, and thus the encoding property K1 indicates that a new start image BSP is to be set here for the second image group GOP2. After the second image group GOP2 the third image group GOP3 is encoded, with for example the output image A21 being created. Thus the first image group GOP1 has two and the second image group GOP2 four original images, which are encoded by the second encoding method CV2.

The exemplary embodiment dealt specifically with the encoding of the original images O3, O4, O5 and O6. The first and the second encoding method CV1, CV2 in this case create a number of items of encoded picture information. In this case the encoded picture information for example includes the intermediate images Z1, ..., Z3, the third output image A3, the encoded images B3, B4, B5, B6, and the movement vector lists ML1, ML, ML3. Other information is also produced during encoding, such as movement vectors in the first partial band encoding for example. For encoding of the entire succession of original images O1, ..., ON, a plurality of encoded picture information is produced in accordance with the first and second encoding method CV1, CV2, which is created in a similar fashion to the exemplary embodiment.

Figure 4:
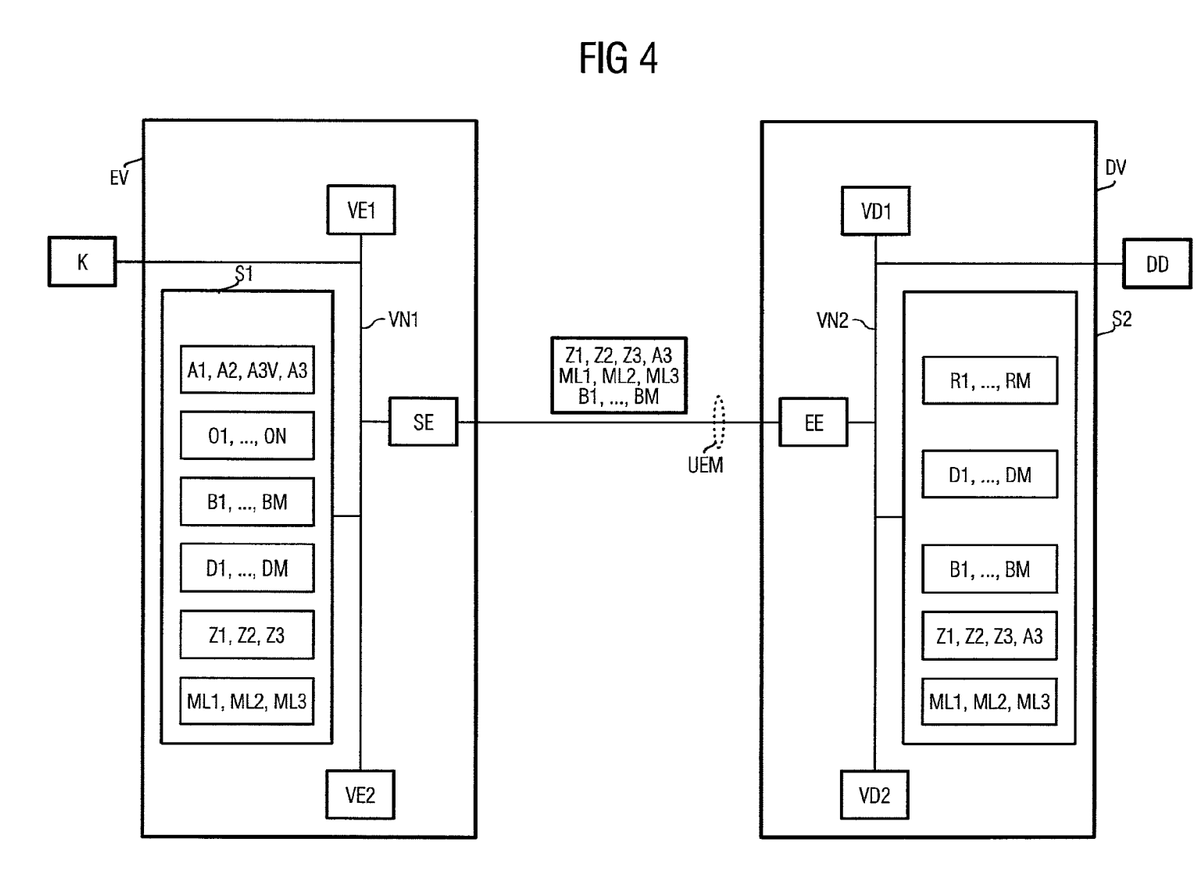
FIG. 4 is a schematic diagram of an encoding device, a decoding device and a transmission medium to execute the described method.

FIG. 4 shows an encoding device EV, a decoding device DV and a transmission medium UEM for transmitting information from the encoding device EV to the decoding device DV. The encoding device EV includes a first video encoding module VE1 with the aid of which a succession of original images O1, ..., ON are created following the first encoding method CV1 are generated into a succession of encoded images B1, ..., BM and from these are generated a succession of decoded images D1, ..., DM. Further the decoding device EV includes a second video encoding module VE2 for executing the encoding of a succession of original images O1, ..., ON in accordance with the second encoding method CV2, taking into account the decoded images D1, ..., DM into intermediate images Z1, Z2, Z3, into output images A1, A2, A3 and for creating a number of movement vector lists ML1, ..., ML3. Furthermore the decoding device EV has a first storage device S1 which stores different images, such as the original images O1, ..., ON, in an organized manner for processing. In addition the decoding device EV contains a transmitter unit SE for transmission of encoded picture information, such as the encoded images B1, ..., BM for example. The transmitter unit SE, the first storage device S1, the first video encoding module VE1 and the second video encoding module VE2 are connected to each other via a first connection network VN1 for exchange of data and control information.

The decoding device DV has a first video decoding module VD1 for decoding the encoded images B1, ..., BM, which were created in accordance with the first encoding method CV1. In addition the decoding device DV has a second video encoding module VD2 for decoding the compressed images created by the second encoding method CV2, such as the intermediate images Z1, Z2, Z3 for example and/or the third output image A3. In addition the movement vector lists ML1, ML3 are also used for reconstruction of the original images O3, O4, O5, O6. Furthermore the decoding device DV includes a receiver unit EE, with which the encoded picture information such as for example the encoded images B1, ..., BM are received and stored in a second storage device S2 for further processing. Finally the decoding device DV also contains the second storage module S2, in which different information and data, such as the movement vector lists ML1, ..., ML3 are stored. The receiver unit EE, the second storage device S2, the first video decoding module VD1 and the second video decoding module VD2 are connected to each other via a second connection network VN2 for exchange of data and control information.

The transmission medium UEM is used for transfer of the encoded picture information from the encoding device EV to the decoding device DV.

The encoding device EV and/or the decoding device DV can be accommodated in a mobile radio device according to the GSM (Global system for Mobile Communications) or UMTS (Universal Mobile Telecommunications system) standard as well as in a computer unit, which is possibly integrated into a portable device. To transfer the encoded picture information between the decoding device EV and the decoding device DV a wireless radio network, in accordance with the GSM standard for example, as well as a wired transmission medium, such as an IP (Internet Protocol)-based network or ISDN (Integrated Services Digital Network) can be used.

In addition to the option of sending the encoded picture information from the encoding device EV to the decoding device DV, it can be expedient in practice to store the encoded picture information on a storage medium such as a CD (Compact Disk) or a video server for example, for subsequent use.

The image decoding method also encompasses a method in which the method for encoding a succession of original images O1, ..., ON can be decoded. For example the succession of encoded images B1, ..., BM is initially decoded through the first video decoding module VD1 into a succession of decoded images D1, ..., DM. Subsequently the second video decoding module VD2 uses the intermediate images Z1, Z2, Z3 and the third output image A3 as well as the assistance of the movement vector list ML1, ML3 and the decoded images D1, ..., DM to generate a succession of reconstructed images R1, ..., RM of the succession of original images O1, ..., ON.

In a possible variant the reconstructed images R1, ..., RN which have been generated by the second video decoding module VD2 are forwarded to an output medium DD, for example a monitor. As an alternative or in addition, the decoded images D1, ..., DM, created by the first video decoding module VD1, can be reproduced on the monitor. For example the decoded images D1, ..., DM exhibit only a reduced image quality, whereas the reconstructed images R1, ..., RM represent a high-quality image. Thus for example the user can select whether a succession of images is to be reproduced in a low or in a high image quality on the output medium.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v *DIRECTV*, 358 F3d 870, 69 USPQ2d 1865 (Fed. Cir. 2004).

The invention claimed is:

1. A method for encoding a succession of original images, comprising:
    creating a succession of decoded images from the succession of original images based on a first coding method, which is based on a motion-compensated, predictive coding; and
    before an image encoding of an image group of consecutive original images by a second coding method, which is based on a motion-compensated, temporally filtered subband coding, defining a first image of the image group based on an identified encoding property of one of the decoded images, which is used to create an output image of a lower resolution level of the image group, with at least one output image being generated at each resolution level by the image encoding of the consecutive original images of the image group and of at least one of the decoded images.

2. A method as claimed in claim 1, wherein the first image is defined based on a used, decoded image if an evaluation of the encoding property shows that at least one image block of the used, decoded image was INTRA coded.

3. A method as claimed in claim 2, wherein the first image is defined based on the used, decoded image if the evaluation of the encoding property shows that a first predetermined number of image blocks of the used, decoded image were INTRA coded.

4. A method as claimed in claim 3, wherein the first image is defined based on the used, decoded image if the evaluation of the encoding property shows that all image blocks of the used, decoded image were INTRA coded.

5. A method as claimed in claim 4, wherein a second number of successive original images of the image group to be encoded are set depending on the encoding property determined.

6. A method as claimed in claim 4,
    wherein at least one intermediate image is created at each resolution level, and
    wherein the intermediate images and the at least one output image of the lower resolution level are compressed.

7. A method as claimed in claim 6, wherein compression is performed according to a wavelet-based transformation.

8. A method as claimed in claim 3, wherein a second number of successive original images of the image group to be encoded are set depending on the encoding property determined.

9. A method as claimed in claim 3,
    wherein at least one intermediate image is created at each resolution level, and
    wherein the intermediate images and the at least one output image of the lower resolution level are compressed.

10. A method as claimed in claim 9, wherein compression is performed according to a wavelet-based transformation.

11. A method as claimed in claim 2, wherein a second number of successive original images of the image group to be encoded are set depending on the encoding property determined.

12. A method as claimed in claim 2,
    wherein at least one intermediate image is created at each resolution level, and
    wherein the intermediate images and the at least one output image of the lower resolution level are compressed.

13. A method as claimed in claim 12, wherein compression is performed according to a wavelet-based transformation.

14. A method as claimed in claim 1, wherein a second number of successive original images of the image group to be encoded are set depending on the encoding property determined.

15. A method as claimed in claim 1,
    wherein at least one intermediate image is created at each resolution level, and
    wherein the intermediate images and the at least one output image of the lower resolution level are compressed.

16. A method as claimed in claim 15, wherein compression is performed according to a wavelet-based transformation.

17. An image decoding method, comprising:
    decoding at least one image encoded in accordance with the method as claimed in claim 1, where the at least one image includes at least one of an intermediate image and the at least one output image of the lower resolution level.

18. A decoding device, comprising:
    a decoding unit decoding at least one image encoded in accordance with the method as claimed in claim 1, where the at least one image includes at least one of an intermediate image and the at least one output image of the lower resolution level.

19. An encoding device for encoding a succession of original images, comprising:
    an encoding unit to execute:
        creating a succession of decoded images from the succession of original images based on a first coding method, which is based on a motion-compensated, predictive coding; and
        defining, before an image encoding of an image group of consecutive original images by a second coding method, which is based on a motion-compensated, temporally filtered subband coding, a first image of the image group based on an identified encoding property of one of the decoded images, which is used to create an output image of a lower resolution level of the image group, with at least one output image being generated at each resolution level by the image encoding of the consecutive original images of the image group and of at least one of the decoded images.

* * * * *